United States Patent [19]
Lee et al.

[11] Patent Number: 5,991,831
[45] Date of Patent: Nov. 23, 1999

[54] HIGH SPEED SERIAL COMMUNICATIONS LINK FOR DESKTOP COMPUTER PERIPHERALS

[76] Inventors: David D. Lee, 3715 Redwood Cir., Palo Alto, Calif. 94306; Derek McAuley, Dept. of Computing Science Lilybank Gardens University of Glasgow, Glasgow, United Kingdom; Neil Wilhelm, 2110 Prospect St., Menlo Park, Calif. 94025; J. Duane Northcutt, 1621 Waxwing Ave., Sunnyvale, Calif. 94087

[21] Appl. No.: 08/502,956

[22] Filed: Jul. 17, 1995

[51] Int. Cl.$^6$ .............................. G06F 13/00; G06F 15/16
[52] U.S. Cl. .............................. 710/33; 710/126; 709/251
[58] Field of Search ..................... 395/821, 824, 395/826, 828, 831, 835, 837, 853, 200.81, 306

[56] References Cited

U.S. PATENT DOCUMENTS

| | | |
|---|---|---|
| 4,566,097 | 1/1986 | Bederman ............................ 370/89 |
| 4,757,497 | 7/1988 | Beierle et al. ......................... 370/89 |
| 5,121,384 | 6/1992 | Ozeki et al. .......................... 370/60 |
| 5,245,605 | 9/1993 | Ofek .................................. 370/85.12 |
| 5,317,693 | 5/1994 | Cuenod et al. ...................... 395/275 |
| 5,517,656 | 5/1996 | Shi .................................... 395/800 |

OTHER PUBLICATIONS

Bursky, D., "New Serial I/Os Speed Storage Subsystems," *Electronic Design* (Feb. 5, 1995) 43(3):81–91.

Imai, K., et al., "ATMR: Asynchronous Transfer Mode Ring Protocol," *Computer Networks and ISDN Systems* (Mar. 1994) 26(6/8):785–798.

*Primary Examiner*—Ayaz R. Sheikh
*Assistant Examiner*—Jigar Pancholi
*Attorney, Agent, or Firm*—Townsend and Townsend and Crew LLP

[57] ABSTRACT

The system described provides a reconfigurable serial interconnection among a processor, whether in a workstation or a server, and user class I/O devices, such as video display terminals, storage devices, and other peripherals. Sustainable I/O throughput of 1 Gbps or more supports the needs of display and video input devices. In addition the system allows hot plug-and-play of user class I/O devices.

12 Claims, 6 Drawing Sheets

HIGH SPEED SERIAL COMMUNICATIONS LINK FOR DESKTOP COMPUTER PERIPHERALS

BACKGROUND OF THE INVENTION

This invention relates to interconnection systems for desktop computers, and, in particular to a high speed interconnection system for interconnecting the components of a desktop computer to each other.

In the world of desktop computer systems it is necessary for each component of the system to be interconnected with other parts of the system. This cabling of desktop computer systems has always been troublesome. The state of the art now is that each desktop input or output (I/O) device requires its own connector, cable, and protocol. For example, monitors are connected to the computer processor through one type of cable, external storage through another type of cable, video cameras through a third type of cable, etc. Past attempts at introducing some regularity to desktop cabling include the Small Computer Systems Interconnect (SCSI) and the Apple Desktop Bus (ADB). More recent attempts to simplify the desktop cable snarl include the IEEE P1394 serial bus standard or its implementation, the FireWire™ system, being developed by Apple Computer. None of these interconnection systems, however, has addressed the full range of desktop I/O devices; most of them ignoring displays and video input devices.

Current desktop cabling standards also limit the user's options and ability to change the user's desktop configuration. The extent of a desktop configuration is limited because the fan-out of the connectors is limited. The addition or removal of a device is complicated because the system must be turned off, device IDs must be properly set, and the necessary terminators installed, according to arcane (to most users) rules.

SUMMARY OF THE INVENTION

The system of this invention, which is sometimes referred to herein as DeskNet™, addresses the full range of user class I/O devices. These range from near-zero bandwidth devices, such as keyboards, to gigabit bandwidth devices, such as displays. DeskNet™ provides an I/O interconnect system of daisy chained digital serial links to form an effective ring topology, the media access protocol run on the ring topology, and the software device drivers built on the protocol. The system of this invention simplifies the process of reconfiguring a desktop: devices may be connected or disconnected while the system is on; there is no need to turn the system off, set dip switches, or otherwise reconfigure devices. Devices are automatically recognized without requiring the user to select device IDs. Furthermore, the system of this invention provides a low cost, effective solution to the problem of desktop interconnection.

This invention provides a system for interconnecting all of the components of a desktop computer using a single cable. Several important advantages are provided by using the system of this invention. First, the simplified cabling increases the flexibility users have in selecting and attaching their I/O devices. Second, the requirement that the processor be near the desktop is broken, enabling new convenience for the user and new classes of system design.

In a preferred embodiment the system of this invention includes a fiber optic cable coupled to the computer processor through a host interface, a first link module coupled to the fiber optic cable and to the video display device, a twisted pair cable coupled to the first link module and extending to at least one second link module, and an additional computer peripheral device coupled to the at least one second link module.

In another embodiment a method of providing for interconnections among a set of computer peripherals coupled to a computer processor includes providing a daisy chain of serial links to form a ring topology extending from the computer processor to each of the computer peripherals, each of the peripherals being coupled to the ring by a link, sending data from the computer processor in cells on the ring, each cell having an address designating the peripheral to which the information is to be provided, and providing each of the peripherals with an address to enable it to send and receive data on the ring. Several key features of the slotted ring protocol employed include bandwidth reuse through destination release of cells, flow-and-error-control through source release of cells, and a bandwidth reservation mode between two nodes with a provision for falling back to a fair-share mode for improved responsiveness.

DESCRIPTION OF THE SPECIFIC EMBODIMENT

Not every user of a computer system wishes to use the "standard" desktop configuration offered by manufacturers or system administrators. A user may wish to have a different number or set of I/O devices, or position them differently on the user's desk or in the user's office. Users often choose to have different numbers or kinds of displays and pointing devices. Some may want private scanners or printers. Requests for custom configurations are often resisted by system administrators because of the difficulties in assembling and maintaining them. Using the system of this invention, an unsophisticated user can assemble and maintain a unique configuration of user class I/O devices. The user can change his configuration at will without the aid of the system administration staff or other expert assistance.

Figure 1:
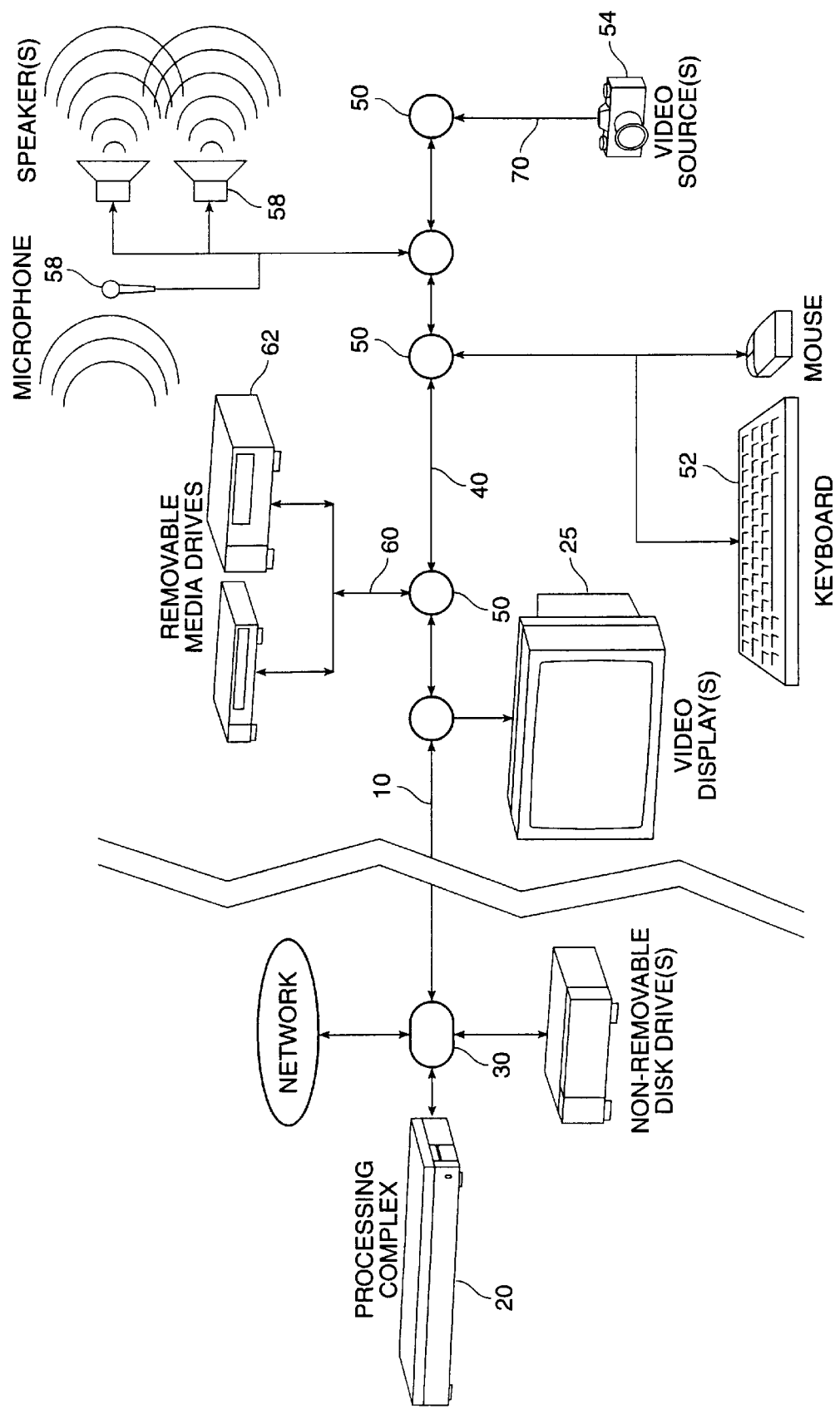
FIG. 1 is a diagram illustrating a typical desktop computer configured using the techniques described herein.

FIG. 1 is a diagram illustrating a typical desktop computer system configured using the techniques described herein. Because it is not necessary for the processor 20 to be on or immediately adjacent to the desktop, new possibilities arise for the arrangement of the computing resources. In the simplest case, the user may locate the cabinet containing the processor 20 in the most convenient part of his office, without regard for proximity to the desktop. In the more general case, the processor may be located in a more suitable part of the building where it can be properly cooled and isolated for noise.

Typical devices coupled to the processor are a video display 25 and capture devices 54 (displays and cameras), SCSI devices 62 (CD ROM players, tapes, and discs), and low-bandwidth devices such as keyboards and mice 52. Preferably, each device is adapted to DeskNet™. For example, in the preferred embodiment we use a camera that already has an ATM interface. Because it operates in an asynchronous transfer mode (ATM) environment, it can readily be adapted for use with DeskNet™. Keyboards and mice are required, as are a SCSI devices so that custom desktop configurations can be assembled. High-quality audio 58 also can be added so that full audio/visual services are brought to the desktop.

The capability of locating the processor 20 away from the user's office provides several advantages. First, the user may tap directly into processing resources that may not be feasibly located in an office. Such processing resources may offer quantities of processing power or storage that would be otherwise unavailable, or accessible only through a less powerful desktop processor. Second, the "processing resources" can be assembled in new ways. One arrangement might be racks of processor boxes with one box per office; a more economical solution might be a large multiprocessor server whose full power can be available to any user. Through the use of the system described herein, the provision of processing power can be done in ways that are more cost effective, easier to administer, and yet offer more power to the individual user.

Centralizing the computing resources may seem retrograde in this era of the personal computer. Studies have shown, however, that the "cost of ownership" of a desktop PC is much higher than the corresponding resources provided from a central location. Aside from issues about the reliability of a central service, one of the main problems of centralized systems has been providing full I/O performance and flexibility to the individual desktop.

As shown in FIG. 1, in the preferred embodiment the CPU 20 is connected via a fiber optic cable 10 to a gigabit I/C link module 30. The processor cabinet includes an added card, termed a host interface to interface the processor and its buses to the system of FIG. 1. A twisted pair cable 40 can then used for the remainder of the link. Connectors 10, 40 typically also include separate conductors for power, ground and a clock signal. Using modules 50, a keyboard 52, and video cameras 54 are connected to the link 40. Modules 50 also permit the interconnection of SCSI buses 60 and asynchronous transfer mode buses 70 to the link. The SCSI bus 60, as is well known, can provide interconnections to suitable peripheral devices such as CD ROM players, floppy disk drives, and hard disk drives.

The system provides a minimum realizable output bandwidth of about 1 gigabit per second (Gbps), i.e., one billion bits per second. Lower bandwidths typically cannot meet the needs of displays or video cameras. This high bandwidth requirement is provided at a low cost because the typical collection of desktop I/O devices is not expensive. For this reason, and to keep the cabling itself manageable, a fast serial interconnect 10, 40 is used.

In the preferred embodiment each link module provides a serial connection port, and data is communicated among the devices using a slotted ring approach. The size of DeskNet cell is chosen to support interoperability with local area networks employing the ATM protocol. We refer to the protocol as media access protocol in the following description.

The system is capable of supporting at least the devices expected on the conventional multimedia desktops. The main consumers of bandwidth are full frame rate video output to a mega-pixel display 25 and several full rate video inputs nodes 54 of broadcast quality. This requires an output bandwidth of slightly less than 1 Gbps for the dumbest display device; while an input bandwidth of this order supports 4 broadcast-quality video input streams. The bandwidth requirements of other desktop I/O devices are tiny compared with video output and input.

In a preferred embodiment, there are two distinct kinds of connections made with the system shown in FIG. 1. First is the connection from the processor to the desktop. This is shown as connection 10 extending between the unit containing the central processing unit 20 and the video display connection link or module 30. Second are the connections to the desktop devices themselves. These connections are shown as connections 50 beyond the link 30. Modules 30 and 50 are identical except for the fact that module 30 connects to fiber optic cable and module 50 to twisted pair.

If the processor is remotely located, the connection 10 from the processor 20 to the desktop may require a very long cable. Although other materials and techniques may be used, such as infrared, radio frequency, etc., the most practical medium now available for 1 Gbps transmission over tens or hundreds of meters is optical fiber. The cost of multimode fiber and 1 Gbps links has been decreasing rapidly, making it a practical solution. Optical fiber has the additional advantage of providing electrical isolation, otherwise necessary anyway, between the processor and the desktop, eliminating the possibility of electromagnetic interference (EMI) from the long cable.

Connections "on the desktop" are made to devices that are all within the same office. Thus cable runs will be less than about 5 meters, and shielded twisted pairs 40 are adequate for signal transmission. The cable consists of two twisted pair data wires, power wires, and a clock wire. The power wires carry enough current to power the link modules connected to the chain, and each node uses the distributed clock as a reference clock for serial data and clock recovery. Of course optical links can be used for this function if necessary.

Because the connection from the processor to the desktop is through a medium different from the medium used on the desktop, a conversion is required. This conversion is done in the first desktop I/O device or module 30 in the chain, which is typically the module for coupling the display 25. Furthermore, because the user may turn desktop I/O devices on or off at will, the "first" device 30 should pass "link power" down the desktop cable to keep the connection operating. Thus, as described, the elements of the system are the Link Module 30, the Host Interface, and the Media Access protocol. Each of these elements is described further below.

Figure 2A:
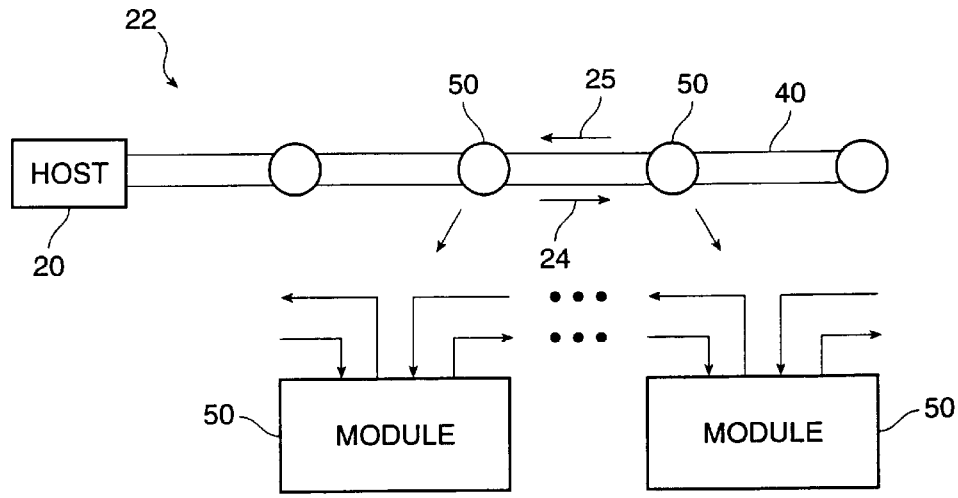
FIG. 2A illustrates the overall topology of the ring communications system.

FIG. 2A generally illustrates the arrangement of the modules 50 and interconnecting cable 40. As shown in FIG. 2A, the host computer 20 is coupled to the ring 22. At locations along the ring, modules 50 are interposed, as has been explained above. As with other rings, generally data can be considered to flow in one direction 24 and return from the end of the ring in the other direction 25. As shown in the figure, each module 50 effectively connects to both side of the ring, and allows it to be extended by simply plugging in additional cable into the last module. Each module includes logic for detecting whether any downstream module is present. If no downstream module is present, then that module automatically terminates the ring by connecting the downstream path to the upstream path. This topology enables easy configurability and extendibility. Nodes may be readily added or subtracted, even with the ring operating. Such an arrangement allows the ring to be readily adaptable to existing interfaces, and enabling the addition of noncompatible systems by simply coupling them to a module with an appropriate interface.

As suggested by FIG. 2A, each module effectively allows an input/output device to be considered to be on either side of the ring. In other words, a transmission from an I/O device coupled to one of the modules 50 first proceeds downstream in the ring, and then passes that module again on the upstream back to the host 20. The capability for each module to detect the existence of downstream modules is provided by the protocol of the serial interconnect system, which is described below in conjunction with FIG. 2B.

Figure 2B:
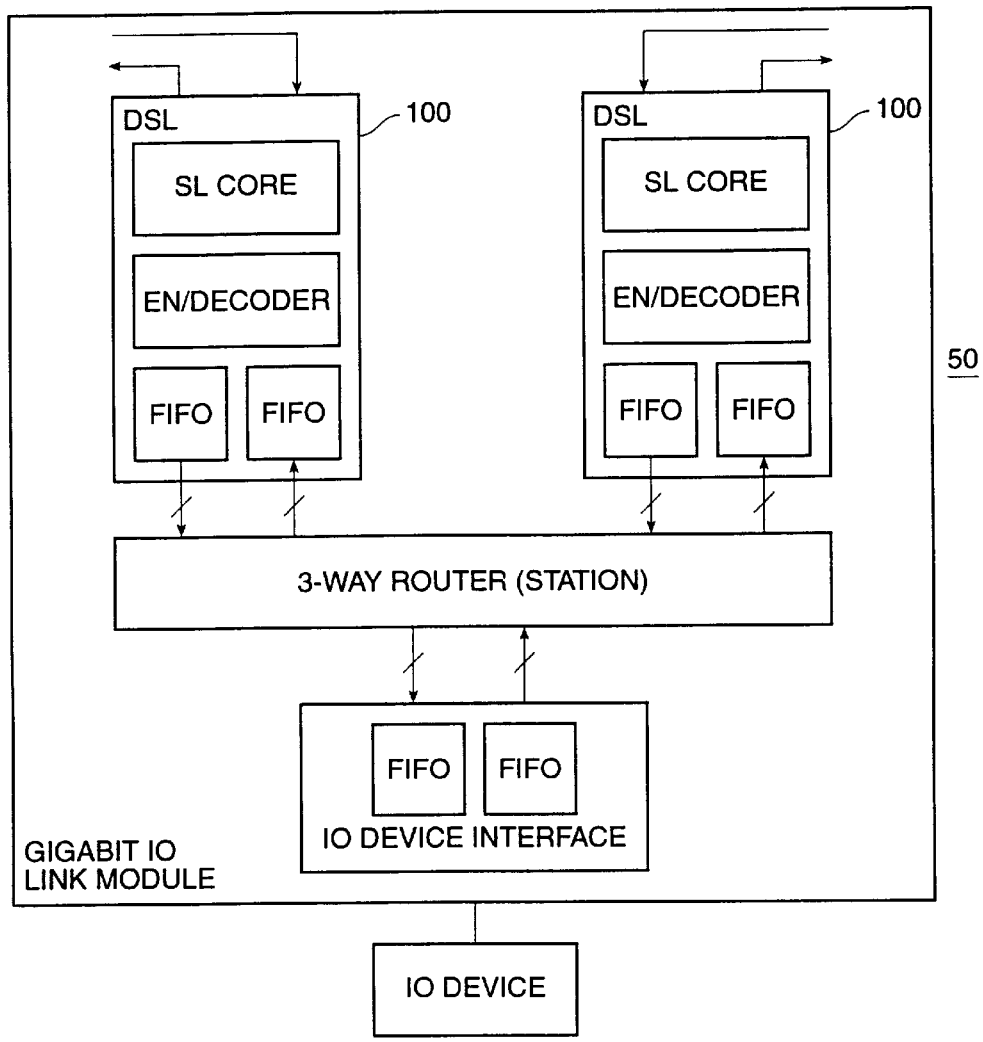
FIG. 2B illustrates a link module.

FIG. 2B illustrates a link module 50. The module extracts and delineates a sequence of cells from an incoming datastream, herein termed a serial link. In addition the module 50 provides the inverse function of framing outgoing cells onto the serial link. The format and design of the serial link are described in detail in commonly assigned copending U.S. patent application Ser. No. 08/254,326, filed Jun. 6, 1994, and entitled "High Speed Serial Link for Fully Duplexed Data Communication." The units of information on the serial link are cells, and the module interface is sufficiently wide (in bits) to enable low clock rates to be used in the host interface and the desktop I/O devices, for example, less than 50 mHz.

To enable plug and play operation, the link modules 30 have two bidirectional ports 100 to form a daisy chain. This is achieved by connecting the serial bit stream from the input of one port to the output of the port in the next module. By allowing the dynamic selection of the paths at configuration time, however, it is possible to aid the media access control layer in reusing bandwidth and provide the ability to isolate devices which are off or faulty. For that reason the link module 50 includes a configurable 3-way routing function. The routing function allows the I/O device interface to choose whether to add data to the datastream, withdraw data from the datastream, or simply allow the data to pass unaltered.

Figure 3:
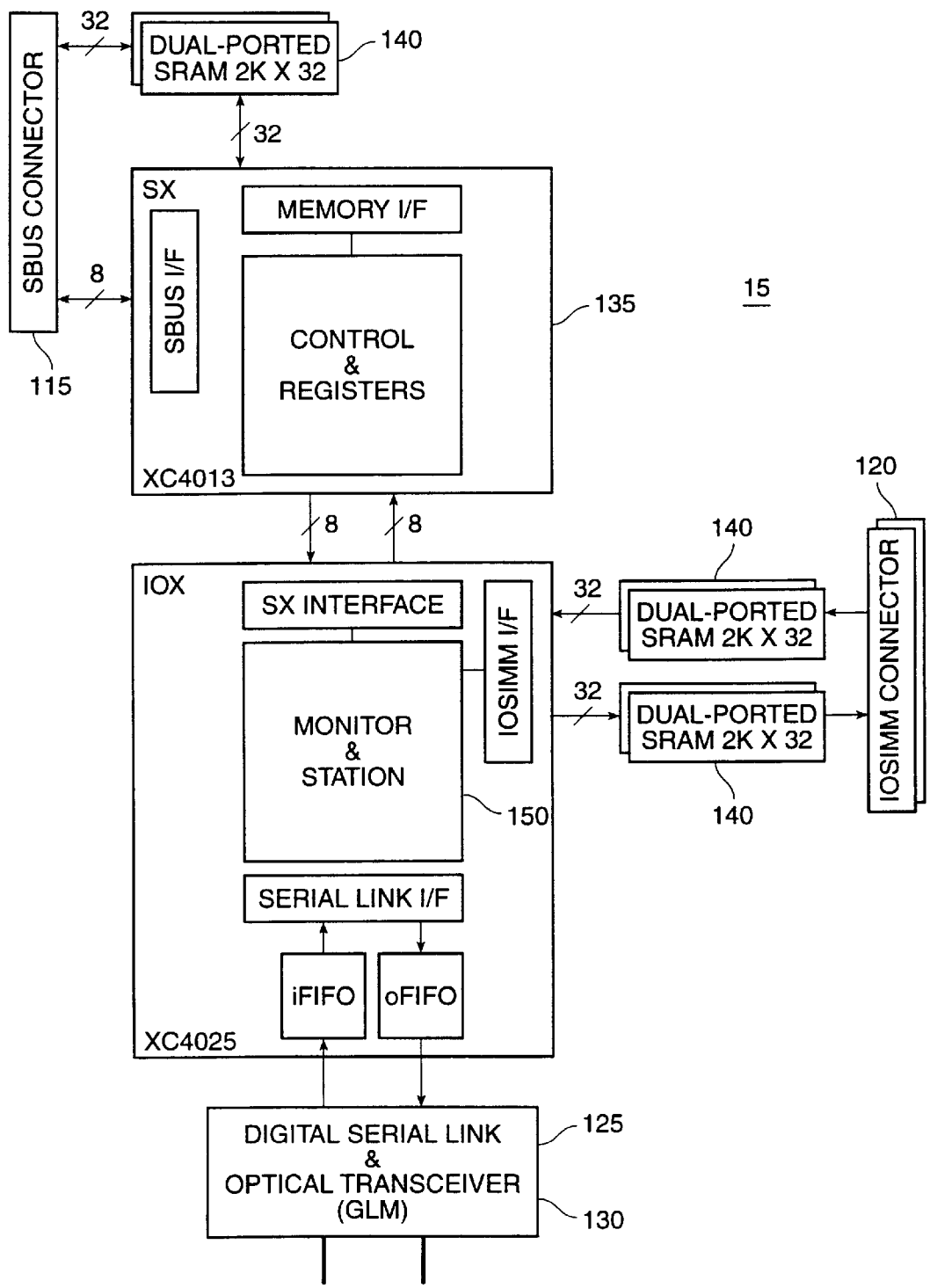
FIG. 3 illustrates the logical mapping of buffers.

FIG. 3 is a block diagram of the host interface card 15 which connects both the SBUS 115 and I/OSIMM 120 to the system described herein. (The SBUS and I/OSIMM are provided in the processor cabinet, for example, as manufactured by Sun Microsystems.) This enables testing and low bandwidth communications (e.g., keyboard, mouse, audio) to be implemented over the SBUS 115, while the higher bandwidth channels used by displays and video cameras are accessed using the I/OSIMM 120. The interface card contains the serial link chips 125, the optical transceivers 130, and the link-layer control logic 135. The SRAMs 140 can be used as cell buffers for send, receive and DMA operations, and also as cell descriptors containing cell control information. The implementation of the logic uses an FPGA, supported by external SRAMs 140 for data buffering. The logic incorporated into the FPGA coordinates the activities of the DeskNet™, the I/OSIMM, and the SBus.

The media access layer provides communication that is reliable in the presence of bit errors and node congestion. For simplicity this is implemented by error checks and acknowledgments. The communication is achieved using a slotted ring with a single cell size. The media access control layer protocol provides for utilization of the full channel capacity by a transmitter with the ability for other nodes to preempt. The provision of an acknowledge for some cells allows packet level error control with scope for bandwidth reuse, while the acknowledge mechanism also provides flow control which enables provision of limited numbers of reassembly contexts (e.g., 1) in simple devices. Guaranteed capacity is provided by "call admission" control and packet level scheduling of the ring. Each node operates in one or two modes—transmit at full rate possible and transmit at guaranteed rate.

Another feature of the invention is the technique by which bandwidth management is provided. The system enables both source and destination release of cells in the ring. In prior art systems, a source release allowed the originating device to do the release of a cell; however, this unnecessarily consumes the return path by requiring the data to return to the source before that bandwidth can be reused. In other prior art devices, a destination release was provided which had the receiving device remove the data from the ring. This had the disadvantage of precluding the source from "knowing" if the data was received correctly and that the destination is capable of receiving more data. In this system a hybrid approach is used. The variable size packets are divided into fixed size cells. The first and last cells of each packet are designated to be source-released cells, while the remainder of the intervening cells are released at the destination. This technique has the advantage of freeing bandwidth of the ring, in that virtually all of the cells are released by the receiving node and can be reused by any downstream node. Because the first and last cells are not released, however, the source device can still receive an acknowledgment that the data was correctly received by the destination device and an indication that the destination can or cannot accept more data at this time.

Two management entities are present on the ring: the monitor and the master station 150. Hot insertion and removal of nodes from the ring is performed by firmware invoked as a result of the physical process of insertion and the act of running a "dismount" command for the device. The monitor 150 is responsible for generating the ring framing structure and fitting in as many cells as possible given the bits composing the ring. If the ring changes in size (e.g., due to an addition or deletion of a new node), the monitor is responsible for "reframing" the ring. Most such instances can be planned, so that a reframe does result in lost data. The master is responsible for the call admission, packet level scheduling of the ring and is the source for the scheduling information (peak and fair-share parameters) for the nodes.

The framing structure for a single revolution of the ring contains frame information (the frame marker, including the serial link resynchronization pattern and an accurate time stamp), followed by a sequence of cells and then a gap (the number of bits required to close the ring). A cell consists of a header, a payload and a trailer. The header contains elements derived from the functions required to be supported for interconnection to ATM networks with Broadband ISDN (BISDN) cell formats. The remaining bits in the header and trailer implement the media access control layer.

Media access is per cell. The media access protocol is an empty cell protocol with a combination of destination release to enable bandwidth reuse and source release to implement flow control and reliability. Provision is made for transmitters to acquire the complete capacity of the ring with the ability of other stations to preempt by issuing a cell release request.

The master station preschedules transmissions based on knowledge of the bandwidth and timeliness required by different streams, the amount of buffering available and number of reassembly contexts at receivers. A transmitter has two rates at which it may transmit at a given time: a peak rate and a fair-share rate. Bandwidth allocation is controlled by software.

Another feature of the system of this invention is the provision of centralized scheduling. At the time an additional node is added to the system, that node effectively asks for bandwidth from the master station in an amount sufficient to meet that node's lowest expected need. Because each station can use any empty cell to put data onto the ring, in the event that station cannot get onto the ring within a given number of cells, it sets a flag, effectively asking to be serviced. As the flag rotates around the ring, each additional module on the ring sees the flag and turns off whatever use that station is making of optional cells, that is cells in addition to its lowest expected need. When these empty cells pass the station which set the flag, that station can then use the empty cells to transmit. The sum of the lowest expected need from all of the stations defines 100% of the bandwidth available.

The header for each cell contains one maintenance bit (MP) and three MAC bits (FE, ARQ, SRR), while the trailer is simply composed of one MAC bit (ACK). These bits are defined as follows. The Monitor Passed (MP) bit is set by the monitor station when a non-empty cell passes the monitor. If the monitor sees the MP bit set in a non-empty cell, it frees the cell and clears the MP bit. This is a maintenance function and solves the problem of "lost" cells constantly rotating. The Full (FE) bit designates when the payload is in use. A station may transmit when it sees a cell with the FE bit unset. It does so by setting the FE bit, clearing the MP bit, copying the header and payload data from its transmit buffer, and if an acknowledge is required, setting the ARQ bit and clearing the ACK bit (described below).

The Acknowledge Request (ACK) bit, when unset, requests destination release. This is performed on reception by the destination by clearing the FE bit. When ARQ is set it requests an acknowledgement from the destination and selects source release—the destination leaves the header unchanged and modifies the ACK bit according to whether the cell was accepted or not. The source then frees the cell by clearing FE.

The Slot (or cell) Release Request (SRR) bit is independent of the cell it is associated with and requires any scheduled transmitter running at its peak rate to back off to its "fair-share" rate. Such a "backed-off" transmitter stays in this state until it sees a complete revolution of the ring with this bit clear. The intention is that a station with an unscheduled cell to transmit, or which is not getting sufficient bandwidth, may set this bit to request that others back off to their fair-share rate. If ARQ is set in the header it requires the destination to mark the ACK bit with the receive status of this cell. A value of 1 denotes successful reception while a value of 0 denotes failure, resulting in retransmission.

When transmitting packets as a sequence of cells, the first and last cell of the packet have ARQ set and all others have ARQ clear. The first cell will be negatively acknowledged if no reassembly context or buffer is available for reassembly. In this case transmission of the packet is terminated early. The final cell is positively acknowledged if no line errors have been detected during the sequence and the reassembly buffer did not overflow. An important implication of this approach is that reassembly is only started by a cell with ARQ set.

The use of ARQ/ACK provides the required acknowledge function (receiver started and completed reassembling packet), yet for large data packets allows the majority of cells to be "reused." Because single cell packets do not need reassembling, single cells can be received at all times. This allows control cells to be received at all times. Further, important control cells set ARQ and retransmit until ACK is received.

A feature of shared media networks is the broadcast/multi-cast capabilities. For this reason, Virtual Channel Identifiers (VCIs) are used in packet headers rather than source/destination addresses and port numbers. This simplifies the integration with BISDN-like networks. In a receiver, the VCI field in the cell header can be used to address a look-up table which contains VC information. From the control layer point of view the required information consists of one of three states: ignore (not for me), copy (take a copy and pass on—ignore ARQ), consume (final recipient—check and act on ARQ). The size of the VCI field is dictated by the number of simultaneous VCs on the ring, and is typically 16.

The system startup initializes the VC table within a station with a "consume" entry on a bootstrap VCI, followed by the station sending periodic (low frequency) "please configure me" messages on a further well-known VC on which the master station is listening. The master, on receiving such a message, issues a cell to configure the relevant station to a control VC which simultaneously disables the bootstrap VC.

Figure 4:
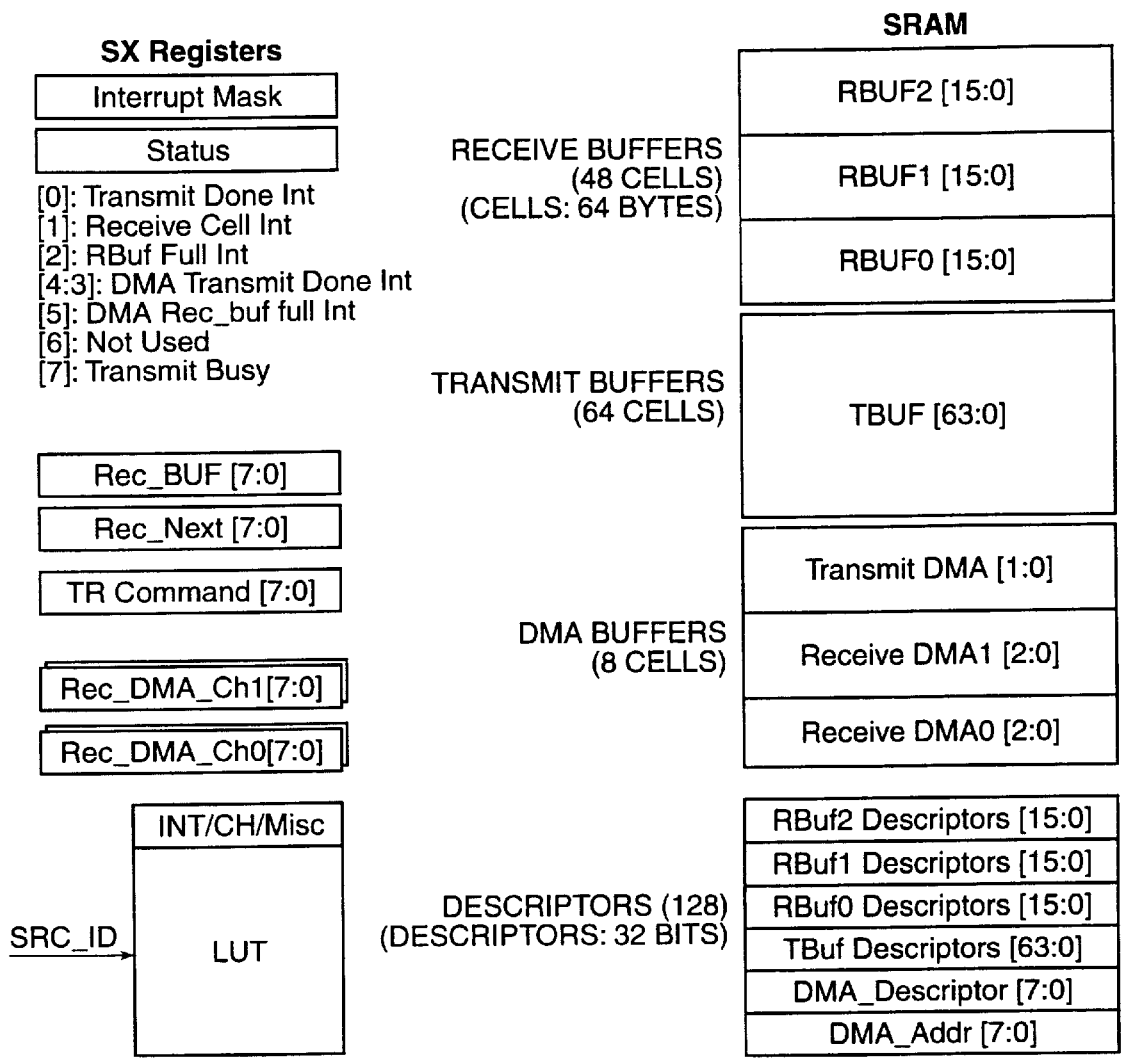
FIG. 4 illustrates the control registers and the organization of SRAM.

Table 1 below illustrates the logical mapping of buffers shown schematically in FIG. 3. The size of the cell is 64 bytes and cell descriptor is 32-bits wide. There are 64 cells in the send buffer pool, 48 cells in the receive buffer pool, and 8 cells in DMA buffer pool. There are 128 cell descriptors. The control registers implemented in SX and the organization of SRAM are shown in FIG. 4.

The procedures for transmission and reception are described below.

| PA[23:22] | PA[21:20] | PA[12:0] | Registers |
|---|---|---|---|
| 00 | xx | 0x0000-0x1FFF | F-Code PROM |
| 01 | 00 | 0x0000-0x00FF | Status Registers (8b) |
|  | 01 | 0x0000-0x00FF | Command Registers (8b) |
|  | 11 | 0x0000-0x00FF | Download IOX (XC4025) |
| 10 | 00 | 0x0000-0x01FF | Descriptors (128 X 32b - 8 cells) |
|  | 01 | 0x0000-0x001F | DMA Buffers (8 cells) |
|  | 10 | 0x0000-0x0FFF | Transmit Buffers (64 cells) |
|  | 11 | 0x0000-0x0CFF | Receive Buffers (48 cells) |
| 11 | xx |  | Download SX (XC4013) |

Figure 5:
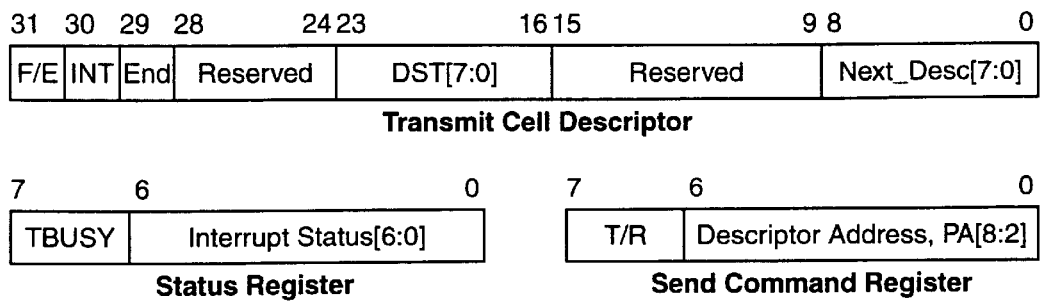
FIG. 5 shows the cell descriptor and transmit formats.

The transmit cell descriptor and transmit buffer formats are shown in FIG. 5. For transmission, at initialization, all send buffers and corresponding descriptors are reset. The device driver maintains send buffers and allocates empty cells and corresponding descriptors. The address of send buffers and corresponding descriptors have the same least significant bits, therefore the cell buffer can be accessed using the descriptor address.

Data to be transmitted is stored in the TBUF cell(s) allocated by the driver and corresponding descriptors are updated. Then the driver writes a transmit command to transmit command register in SX with the address of the first descriptor to be sent. A status bit TBUSY in the status register is set.

Data is then sent according to the first descriptor, and follows the next descriptor pointer until the block number field in the descriptor reaches 0. There is a status bit, INT, in the descriptor. The device driver updates this bit field when the descriptor is written. Upon completion of sending the cell (the end bit in the descriptor is set), the SX interrupts the CPU if the INT bit field is set, clears command register and TBUSY bit in the status register, and also reset descriptors (F/E bit in descriptor) freeing the buffers. Mask register is used to do masked (R/W) operations on status register. Lastly, the driver updates the list of free send buffers.

Figure 6:
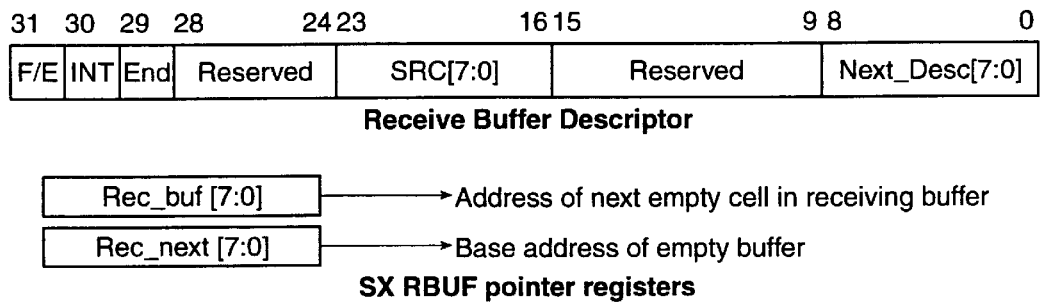
FIG. 6 shows the receive buffer descriptor format.

The receive buffer descriptor format is shown in FIG. 6. To receive data, the receive buffers are organized as a circular buffer and support receiving a multiple context, multi-cell data stream. As a cell is received, the source ID portion of the cell is used to mark the interrupt enable bit in the descriptor. The source ID addressed look-up table for this interrupt enabling can be maintained by the device driver.

Upon completion of the receive operation for each cell, the FE bit field is set and an interrupt is generated if the interrupt enable bit is set. Otherwise the receive operation continues. Upon filling the one RBUF (16 cells), an interrupt is generated such that the driver can empty those filled buffers. The receive operation can continue by replacing the content of rec_buf register with rec_next. Upon receiving an interrupt, the driver first writes to rec_next and transfers data. The third RBUF is provided for the case where transfers from RBUF to memory are slower than receiving rate. The pointer register can increment its content as it receives a new cell. When a cell with interrupt enabled by cell arrives or the receiving RBUF is filled, the corresponding interrupt bit field in SX status register is turned on. Both interrupts can be cleared by writing 0 into the corresponding bit fields (using mask register) of the status register.

Figure 7:
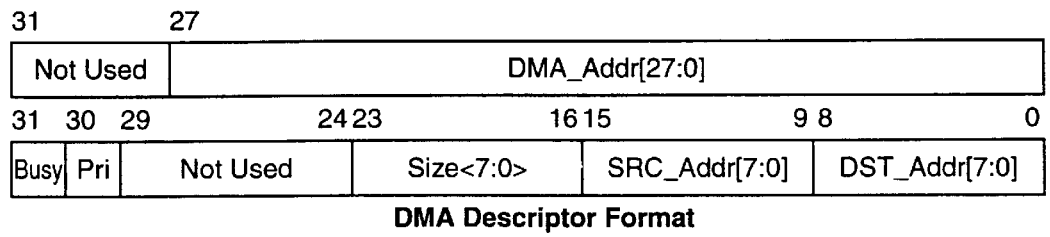
FIG. 7 shows the direct memory access descriptor format.
Figure 7:
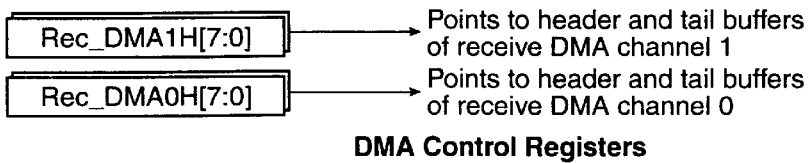

The direct memory access (DMA) is described next and its format is shown in FIG. 7. There are total of 8 DMA buffers: 2 buffers for transmit, and 6 buffers for receive. The DMA transmit and receive proceed similar to the above driver-driven transmit and receive operations, except that the SX initiates and handles data transfers between DMA buffers and the memory. The 16 descriptors (in the lower parts) can be used for DMA buffers. Two descriptors per DMA buffer are used: one for DMA start address and the other for status, size, and etc.

For transmit, the DMA descriptor is written (SX can detect this event) to initiate the DMA transfer followed by transmit. Upon completion of the transmit, the CPU will get an interrupt. The SX status register interrupt field indicates which transmit buffer has finished the transfers. Two transmit DMA buffers can be used for two separate channels. While one channel is busy (indicated by status bit in the DMA descriptor), other channels can be initiated by writing into a new descriptor. The busy bit and size fields are written by the driver and cleared or updated by the SX. The SX handles one channel at a time, but alternates between two channels when both channels are in use. If the priority bit field is set on one of the channel, the SX finishes that channel first.

For the receive, the source ID of incoming data is used (LUT) to identify as DMA transfer and the data is stored into one of buffers in 2 DMA channels. Each channel has 3 buffers and managed similarly with RBufs. Header and tail pointers are managed by the SX. As the receiving buffer becomes full, the header pointer is incremented and the SX starts DMA transfers according to the corresponding descriptor. At the end of DMA transfer, the size field of the descriptor is decremented. The SX generates an interrupt if the difference between header and tail counts is 2, or pending DMA transfers are completed.

Figure 8:
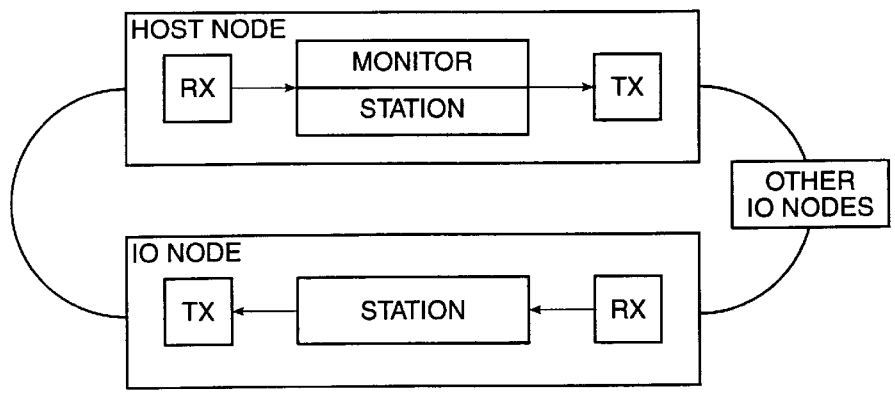
FIG. 8 is a block diagram of the monitor.

The monitor is responsible for generating the ring frame structure and fitting in as many cells as possible given the bits rotating in the ring. A block diagram of the monitor is shown in FIG. 8. If the ring size changes, the monitor reframes the ring. At initialization, a point-to-point link is established before the communication starts as a ring. Establishing the point-to-point link is up to each node at the beginning.

The initialization protocol confirms all links are well established. Then a ring initialization protocol runs to identify nodes attached to the ring and configure the ring frame structure. The frame structure for a single revolution is control header ($32b$-timestamp, sync patterns, number of cells in current ring frame and etc.), followed by cells and then gap (the number of bits to close the ring). The cell ($448b$) is composed of a header ($32b$), payload ($384b$) and trailer ($32b$). The monitor initializes the ring with minimum one cell (cell). If the ring is shorter than a cell, the monitor inserts delay stages to make it more than a cell plus header and gap.

Figure 9:
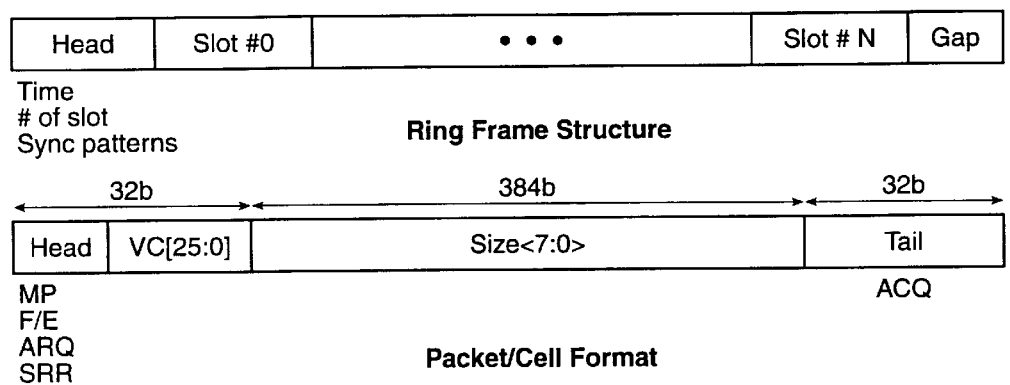
FIG. 9 illustrates the ring frame structure and cell format.

The ring maintenance protocol initiates the ring communication by setting certain parameters at each node and starts the ring frame with initialization values. It also monitors the ring structure for any change and is responsible for sending sync patters periodically to make sure all links are synchronized. The ring frame structure and packet-cell format are shown in FIG. 9.

The media access station is responsible for cell admission, packet level scheduling of the ring and other controls (flow and error control) for each node. At initialization the VC look-up table will be initialized to have one initialized cell while all other cells are reset. As a cell arrives at the node, the station checks each cell's header (VC table look-up) and determines whether to receive the cell or not. If the cell is not for the receiving node or empty, it will be put on to the transmitter. Otherwise, the received cell will be put on receive buffer and the cell will marked appropriately. For the received cell, CRC checking will be performed as payload portion of the cell is being written into the receive buffer.

The preceding has been a description of the preferred embodiment of the high speed serial link desktop interconnection system of our invention. It will be appreciated that numerous modifications can be made to the described embodiments without departing from the scope of the claims appended.

What is claimed is:

1. A system for communicating among a plurality of peripherals coupled to a processor comprising:

a slotted serial communication ring connected to the processor, the ring divided into a fixed integral number of fixed size slots to provide a downstream communications path extending from the processor to enable the processor to transmit data to the peripherals, and an upstream path from the peripherals to the processor to enable the peripherals to transmit data to the processor, the serial communication ring having a predetermined number of cells; and a plurality of modules coupled to the ring, each module including logic for releasing a first portion of the cells for later use by other modules when the data has been read from the ring by the peripheral to which it was addressed, and not releasing at least one of the cells in a transmission addressed to that peripheral to thereby allow data in the at least one cell not released to remain on the ring as an indication to the source that the data was correctly received by the peripheral to which it was addressed, and wherein a communication, from a first module coupled to the ring to a second module coupled to the ring occupies at least one slot, and wherein the second module releases the slot for re-use by another module.

2. A system as in claim 1 wherein the logic releases all of the cells except the first and last cells.

3. A system as in claim 2 wherein the logic in the module at the source releases all of the cells not released by the logic at the module at the destination.

4. A system as in claim 1 for communication among peripherals coupled to a computer processor, the peripherals including a video display device, the system further comprising:

a fiber optic cable coupled to the processor through a host interface, a first link module coupled to the fiber optic cable and to the video display device, a twisted pair cable coupled to the first link module and extending to at least one second link module, and an additional computer peripheral device coupled to the at least one second link module.

5. A system as in claim 4 wherein the at least one second link module comprises a plurality of link modules serially interconnected by twisted pair cable, a separate computer peripheral being connected to each such link module.

6. A system as in claim 5 wherein the first link module comprises:

first and second bidirectional ports coupled to the fiber optic cable for allowing communication to and from the video display coupled to the link module, and a router coupled to each of the ports to select whether the communication is provided to the peripheral coupled to that module.

7. A system for communicating among a plurality of peripherals coupled to a processor comprising:

a slotted serial communication ring connected to the processor, the ring divided into a fixed integral number of fixed size slots to provide a downstream communications path extending from the processor to enable the processor to transmit data to the peripherals, and an upstream path from the peripherals to the processor to enable the peripherals to transmit data to the processor, the serial communication ring having a predetermined number of cells, a communication from a first module coupled to the ring to a second module coupled to the ring occupies at least one slot, and wherein the second module releases the slot for re-use by another module;

a plurality of modules coupled to the ring, each module including logic for releasing a first portion of the cells for later use by other modules when the data has been read from the ring by the peripheral to which it was addressed, and not releasing at least one of the cells in a transmission addressed to that peripheral to thereby allow data in the at least one cell not released to remain on the ring as an indication to the source that the data was correctly received by the peripheral to which it was addressed;

each module providing a connection to the ring for at least one peripheral, one of the modules serving as a master module to allocate the predetermined number of cells, each module being allocated at least some minimum number of the cells, the cells being reallocated each time a new module is connected to the ring;

each module including transmission logic for placing data on the ring if there are empty cells, and for setting a special bit in an already used cell if there are not empty cells; and each module including reception logic for reducing its use of the cells to the minimum number upon detecting that the special bit has been set by another module.

8. A system for communicating among a plurality of peripherals coupled to a processor comprising:

a slotted serial communications ring connected to the processor, the ring divided into a fixed integral number of fixed size slots to provide a downstream communications path extending from the processor to enable the processor to transmit data to the peripherals, and an upstream path from the peripherals to the processor to enable the peripherals to transmit data to the processor, the serial communication ring having a predetermined number of cells;

a plurality of modules coupled to the ring, each module providing a connection to the ring for at least one peripheral, each module including a pair of bidirectional communications ports to connect that module to both the upstream path and the downstream path, and wherein a communication from a first module coupled to the ring to a second module coupled to the ring occupies at least one slot, and wherein the second module releases the slot for re-use by another module; and each module including logic for releasing a first portion of the cells for later use by other modules when the data has been read from the ring by the peripheral to which it was addressed, and not releasing at least one of the cells in a transmission addressed to that peripheral to thereby allow data in the at least one cell not released to remain on the ring as an indication to the source that the data was correctly received by the peripheral to which it was addressed.

9. A system as in claim 8 wherein access to the slotted ring is determined locally by each module connected to the ring.

10. A system as in claim 9 wherein access to the slotted ring is determined based upon whether a slot in the ring is available when the module requesting such slot requests it.

11. A system as in claim 10 wherein the logic releases all of the cells except the first and last cells.

12. A system as in claim 11 wherein the logic in the module at the source releases all of the cells not released by the logic at the module at the destination.

* * * * *